United States Patent Office 3,318,715
Patented May 9, 1967

3,318,715
STARCH AND N-CYANOETHYL-N-HYDROXY-
ALKYL AMINE
Marvin T. Tetenbaum, Petersburg, Va., assignor to A. E. Staley Manufacturing Company, Decatur, Ill., a corporation of Delaware
No Drawing. Filed Nov. 14, 1963, Ser. No. 323,570
14 Claims. (Cl. 106—210)

This application relates to the plasticization of amylose with N-cyanoethyl-N-hydroxyalkyl amines.

For years amylose films have been studied from a more or less academic point of view since amylose was not commercially available. Now that amylose has become available in sizeable quantities, research on amylose films has increased. One of the major problems, which has slowed the commercialization of amylose films, is that the flexibility and elongation of amylose films is dependent upon the water content of the amylose film. At low relative humidity, water is lost by evaporation, and the film becomes extremely brittle and its percent elongation decreases. Even at 50% relative humidity, the film has a low percent elongation and poor flexibility. For the most part, polyhydric alcohols, such as glycerol and sorbitol, have been used as amylose plasticizers. However, these plasticizers are humidity dependent. The object of this invention is to provide a new class of amylose plasticizers.

I have now found that N-cyanoethyl-N-hydroxyalkyl amines are good plasticizers for shaped amylose objects, such as amylose films. These plasticizers can be represented by the formula

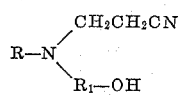

wherein R is hydrogen or an alkyl group, such as methyl, ethyl, propyl, butyl, hydroxyethyl, 2-hydroxypropyl, cyanoethyl, etc. and $R_1$ is an alkylene group such as ethylene, propylene, butylene, etc. Suitable plasticizers represented by the above formula include N-cyanoethyl-N,N-di(2-hydroxyethyl) amine, N-cyanoethyl-N-(2-hydroxyethyl)amine, N,N-di(cyanoethyl) - N-(2-hydroxyethyl) amine, N-cyanoethyl - N-methyl - N-(2-hydroxyethyl) amine, N-cyanoethyl - N,N-di(2-hydroxypropyl) amine, etc. N-cyanoethyl-N,N-di(2-hydroxyethyl) amine is preferred because of its effectivenes, relative low cost and ease of preparation by the reaction of acrylonitrile with diethanol amine.

The weight ratio of amylose plasticizer to amylose (dry solids basis) can range from about 5:95 to 60:40 when the N-cyanoethyl - N-hydroxyalkyl amine is the sole plasticizer. Under most conditions the N-cyanoethyl-N-hydroxyalkyl amine is preferably used in a concentration of from about 10 to 45 parts by weight with correspondingly 90 to 55 parts by weight amylose.

For the purpose of this invention, the term "amylose" refers to the amylose resulting from the separation of the amylose and amylopectin components of starch, or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high-amylose corn starch containing approximately 54% amylose), "Amylon VII" (high-amylose corn starch containing up to 70% amylose), etc. Amylose films, fibers and tubes based on high-amylose corn starch can be simulated by mixing corresponding concentrations of separated amylose with separated amylopectin. Preferably, however, the amylopectin content of the amylose is less than 20% by weight. In general, the higher the concentration of amylose, the better the tensile strength and flexibility of the shaped object. Various derivatives of amylose (amylose acetate, hydroxy-ethyl amylose and hydroxypropyl amylose) such as those described in U.S. Patent 3,038,895 can also be employed. Preferably, the amylose derivative can be dissolved in water and has a D.S. less than one.

Amylose films can be prepared by any of the prior art techniques, such as those described in any of U.S. Patents 2,603,723 to Wolff et al., 2,903,336 to Hiemstra et al., 2,973,243 to Kudera, 3,030,667 to Kunz etc. In these processes the amylose plasticizer (in either the dry form or dissolved in water) is added to a suitable aqueous solution of amylose, dissolved, for example, in aqueous alkali, in hot water at essentially neutral pH, etc. The amylose solution is then cast on a suitable substrate, such as a moving belt, or extruded into a coagulating (acidic or salt) bath. In this way the amylose film is recovered from the aqueous solution by the precipitation of the amylose film from the solvent or by evaporation of the solvent during drying.

These techniques can be employed to prepare self-supporting films, which are large in two dimensions and small in the third dimension, i.e. the two dimensions are each at least 100 times larger than the third dimension. The previously prepared films can also be laminated to a suitable base or the film can be cast or otherwise applied directly on a suitable substrate, e.g. cellulose (cellophane, paper), metal, etc. A particularly useful method of coating paper with a grease-resistant amylose layer is described in detail in commonly assigned application Ser. No. 296,660, filed July 22, 1963.

Amylose film can also be prepared by extruding superfically dry amylose and N-cyanoethyl-N-hydroxyalkyl amine. By superfically dry, I mean that essentially all the amylose plasticizer has been absorbed by the amylose prior to the extrusion step. This technique is described in detail in commonly assigned application Ser. No. 244,127, filed Dec. 12, 1962.

Any of the above extrusion techniques can be employed to prepare amylose fibers and amylose tubes.

The following examples are merely illustrative and are not to be construed as limiting the scope of my invention. All of the data in the examples is an average of five determinations.

*Example I*

An aqueous solution of corn amylose was prepared by pumping an aqueous slurry of 8 grams corn amylose (D.S.B.) in 72 grams of water through a 35-foot long, ⅛" inside-diameter coil of tubing heated to 150° C. having a dwell time of 2 minutes. The aqueous solution was cooled to 95° C. and placed in a preheated Dewar flask, which contained 2 grams of N-cyanoethyl-N,N-di(2-hydroxyethyl) amine in 18 grams water (95° C.). The solution was stirred for 60 seconds and then cast on a lecithin-coated glass plate at 30° C. using a doctor blade preheated to 95° C. The film gelled rapidly as it cooled to room temperature. The same technique was employed for preparing an amylose film having no plasticizer, an amylose film containing 30% plasticizer, an amylose film containing 40% plasticizer, and amylose films containing glycerol as the plasticizer. Each film was stripped from the glass plate and stored at 23° C. and 50% relative humidity. The percent elongation and elastic modulus of the films were determined after one week. The results are set forth below in Table I where E.M. stands for elastic modulus in p.s.i. and E stands for percent elongation.

TABLE I

| Plasticizer | Percent of Film Which is Plasticizer | E.M. | E |
|---|---|---|---|
| None | 0 | 501,000 | 7 |
| N-cyanoethyl-N,N-di-(2-hydroxyethyl) amine | 20 | 175,000 | 5 |
| Do | 30 | 94,000 | 8 |
| Do | 40 | 55,000 | 13 |
| Glycerol | 20 | 250,000 | 16 |
| Do | 30 | 100,000 | 22 |

The above table illustrates that the N-cyanoethyl-N-hydroxyalkyl amine plasticizers of this invention are more effective than glycerol in reducing the elastic modulus of amylose films.

*Example II*

Example I was repeated except that the films were stored at 23° C. and 50% relative humidity for about 6 months. The results are set forth below in Table II.

TABLE II

| Plasticizer | Percent of Film Which is Plasticizer | E.M. | E. |
|---|---|---|---|
| N-cyanoethyl-N,N-di-(2-hydroxyethyl) amine | 20 | 290,000 | 6 |
| Do | 30 | 112,000 | 6 |
| Do | 40 | 46,900 | 7 |
| Glycerol | 20 | 326,000 | 9 |
| Do | 30 | 278,000 | 4 |

The above table illustrates that the plasticizing effect of the N-cyanoethyl-N-hydroxyalkyl amines is more independent of aging than the plasticizing effect of glycerol.

*Example III*

This example illustrates that the N-cyanoethyl-N-hydroxyalkyl amines are effective plasticizers at low humidity. Films were prepared by the method of Example I and then conditioned at 24° C. and 23% relative humidity for one week. A film containing (A) 20% by weight N-cyanoethyl - N,N-di-(2-hydroxyethyl) amine had an elastic modulus of 326,000 p.s.i., (B) 31% by weight N-cyanoethyl-N,N-di(2-hydroxyethyl) amine had an elastic modulus of 175,000 p.s.i. and (C) 44% by weight N-cyanoethyl-N,N-di(2-hydroxyethyl) amine had an elastic modulus of 101,000 p.s.i.

While this invention is principally directed to plasticizing amylose with N-cyanoethyl-N-hydroxyalkyl amines, the N-cyanoethyl-N-hydroxyalkyl amines can be used as solvents, swelling agents or plasticizers for starch. The term "starch" is used in its generic sense to be inclusive of any native starch, modified native starch or derivatized native starch. Corn starch, high amylose corn starch, tapioca starch, wheat starch, rye starch, potato starch, sago starch, waxy corn starch and the amylose and amylopectin fractions therefrom are representative of the various native starches and starch fractions therefrom that can be used with the N-cyanoethyl-N-hydroxyalkyl amines. Any of these starches may be modified by enzyme treatment, by oxidation with alkaline hypochlorite or by hydrolysis with acid, for example, or derivatized by treatment with ethylene oxide, propylene oxide, acetic anhydride, vinyl acetate, chloroacetic acid, etc. The N-cyanoethyl-N-hydroxyalkyl amines can be used (a) in a concentration as low as 1 part by weight per each 19 parts by weight starch in plasticizing starch or (b) in a concentration of 10 to 20 parts by weight or more per each part by weight starch when the N-cyanoethyl-N-hydroxyethyl amines are employed as starch solvents. The N-cyanoethyl-N-hydroxyethyl amines are particularly useful as swelling agents in the extrusion pasting of starch described in commonly assigned application Ser. No. 100,354, filed Apr. 3, 1961, now Patent No. 3,137,592.

Since many embodiments of this invention may be made and since many changes may be made in the embodiments described, the foregoing is to be interpreted as illustrative only and my invention is defined by the claims appended hereafter.

I claim:
1. A composition comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof, plasticized with a plasticizing concentration of a N-cyanoethyl-N-hydroxyalkyl amine having from 2 to 4 carbon atoms in said hydroxyalkyl group.
2. The composition of claim 1, wherein the weight ratio of said N-cyanoethyl-N-hydroxyalkyl amine to amylosic material ranges from 5:95 to 60:40.
3. The composition of claim 2, wherein said amylosic material comprises the separated fraction of whole starch.
4. The composition of claim 2, wherein said amylosic material comprises whole starch containing at least 50% amylose.
5. The composition of claim 3, wherein said N-cyanoethyl-N-hydroxyalkyl amine comprises a N-cyanoethyl-N-hydroxyethyl amine.
6. The composition of claim 2, wherein said N-cyanoethyl-N-hydroxyalkyl amine comprises N-cyanoethyl-N-N-di(2-hydroxyethyl) amine.
7. A continuous amylosic film comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof, plasticized with a plasticizing concentration of a N-cyanoethyl-N-hydroxyalkyl amine having from 2 to 4 carbon atoms in said hydroxyalkyl group.
8. The film of claim 7, wherein the weight ratio of said N-cyanoethyl-N-hydroxyalkyl amine to amylosic material ranges from 5:95 to 60:40.
9. The film of claim 8, wherein said amylosic material comprises the separated fraction of whole starch.
10. The film of claim 9, wherein said N-cyanoethyl-N-hydroxyalkyl amine comprises a N-cyanoethyl-N-hydroxy-ethyl amine.
11. The film of claim 9, wherein said N-cyanoethyl-N-hydroxyalkyl amine comprises N-cyanoethyl-N,N-di(2-hydroxyethyl) amine.
12. A composition comprising starch and a N-cyanoethyl-N-hydroxyalkyl amine having from 2 to 4 carbon atoms in said hydroxyalkyl group in a weight ratio of starch to N-cyanoethyl-N-hydroxyalkyl amine of 19:1 to 1:20.
13. A composition comprising starch and a N-cyanoethyl-N-hydroxyethyl amine in a weight ratio of starch to amine of from 19:1 to 1:20.
14. A composition comprising starch and a N-cyanoethyl-N,N-di(2-hydroxyethyl) amine in a weight ratio of starch to amine of from 19:1 to 1:20.

References Cited by the Examiner

UNITED STATES PATENTS

| 2,017,537 | 10/1935 | Hoffmann et al. 260—465.5 XR |
| 2,943,071 | 6/1960 | Laden 106—210 XR |
| 3,117,014 | 1/1964 | Klug 106—213 |

ALEXANDER H. BRODMERKEL, *Primary Examiner.*

L. B. HAYES, *Assistant Examiner.*